June 14, 1938.  A. P. BELL  2,120,727
ANTIGLARE GOGGLES
Filed Oct. 19, 1936
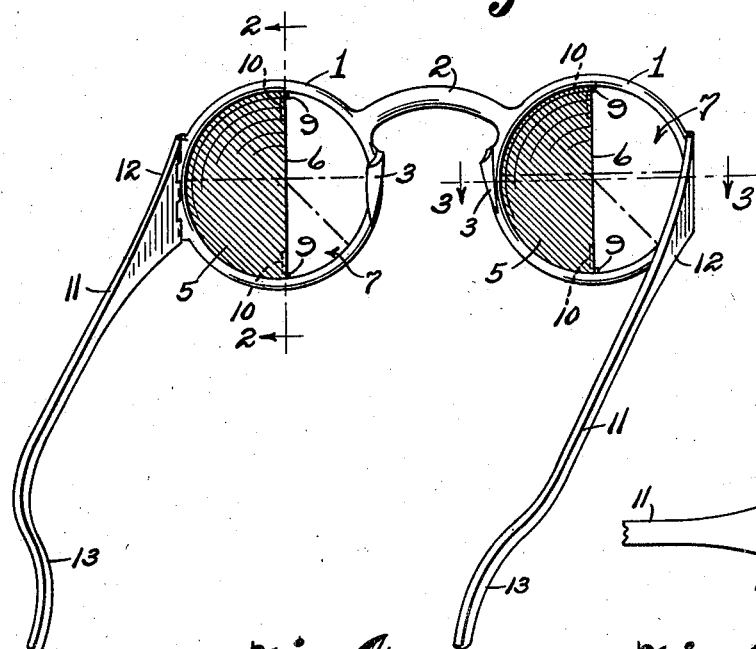
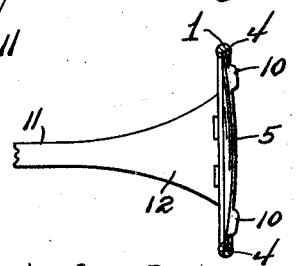
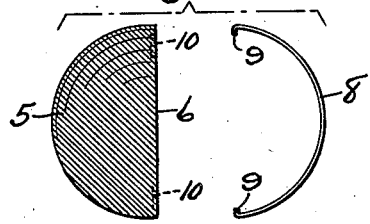
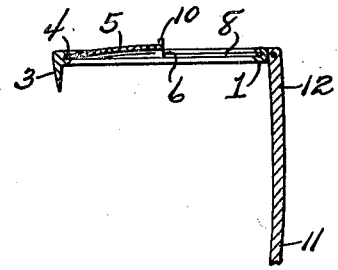
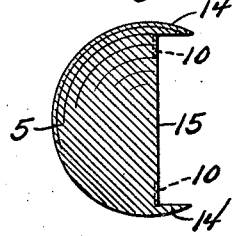
Antoinette P. Bell
INVENTOR
BY Victor J. Evans & Co.
ATTORNEYS Patented June 14, 1938

2,120,727

UNITED STATES PATENT OFFICE 2,120,727

ANTIGLARE GOGGLES

Antoinette P. Bell, Hastings, N. Y.

Application October 19, 1936, Serial No. 106,447

3 Claims. (Cl. 88—41)

This invention relates to anti-glare goggles, and its general object is to provide goggles of that character which are primarily designed for use by drivers of motor vehicles, in. that the lenses thereof can be adjusted to eliminate the glare regardless of the direction of light toward the goggles and in an easy and expeditious manner, without the wearer removing the same.

A further object of the invention is to provide anti-glare goggles that include lenses of a size to leave unoccupied space in the lens rims, to allow easy adjustment of the lenses and so that the driver can obtain a normal view of the road when desired.

Another object of the invention is to provide anti-glare goggles that include temple-bars that have relatively wide portions at their juncture with the lens rims, to act as anti-glare means.

A still further object of the invention is to provide goggles of the character set forth, that are simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view illustrating the goggles which form the subject matter of the present invention.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a detail view showing one of the lenses, and its retaining spring.

Figure 5 is a view of a modified form of lens

Referring to the drawing in detail, and particularly to Figures 1 to 4 inclusive, it will be noted that my goggles include the usual lens frame having rims 1 of circular formation, which are connected by a nose bridge 2 and have nose rests 3 formed thereon.

The rims are interiorly grooved about the entire circumference thereof, to provide a channel 4 to slidably receive curved edges of the lenses 5, for movement therein, as will be apparent.

The lenses 5 are shown as being of substantially semi-circular formation, in that they are provided with straight edges 6, but they may be of other shapes provided of course the curved edge fits the curvature of the rims 1. The lenses are translucent and may be of any color, as well as formed from any material suitable for the purpose, and due to the semi-circular formation, it will be obvious that an unoccupied space 7 is provided, to allow for the movement of the lenses, or the adjustment thereof to various positions with respect to their rims, as suggested in full and dotted lines in Figure 1, and of course the unoccupied space allows the driver to obtain a normal view of the road when desired.

The lenses are not only shown as being of semi-circular formation, but are outwardly curved to provide the concavo-convex formation, as will be noted upon inspection of Figure 3, and in order to hold the lenses in adjusted positions, as well as within the rims, I employ retainers 8 which in fact are semi-circular strands of resilient wire having their ends bent inwardly toward each other as at 9 to contact the straight edges of the lenses at their juncture with the curved edges thereof, as suggested in Figure 4. The retainers 8 are likewise mounted in the channels 4, and it will be obvious that they rotate simultaneously with the lenses when adjusting the latter.

Formed on the straight edges of the lenses and preferably adjacent the ends thereof, are lugs or fingers 10, to facilitate the adjustment of the lenses, and the lugs extend forwardly from the straight edges, as clearly shown in Figure 3.

Hingedly secured to the outer sides of the rims are temple-bars 11 which include relatively wide portions 12 at their hinged ends, which not only strengthen the same at their connection with the rims, but the wide portions likewise act as anti-glare means, in that they prevent the light from entering the space between the head and the rims, at the outer sides of the latter. The temple-bars terminate at their outer ends in curved portions 13 for clamping association with the head of the wearer, in the form as shown, or the portions may be curved to an extent to be disposed about the ears of the wearer, as will be apparent.

In Figure 5, I have illustrated a modified form of lens which is similar to the form previously mentioned, with the exception that it is provided with extensions 14 projecting laterally at the upper and lower ends of the straight edge 15. The extensions 14 make it possible to eliminate the retainers 8, thereby reducing the cost of manufacturing the goggles. The extensions are relatively narrow and the outer edges thereof follow the curvature of the curved edge of the lenses, while their inner edges are straight and disposed at right angles with respect to the straight edge 15.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. Anti-glare goggles comprising a frame, including circular rims, each having a groove in the inner surface thereof, translucent lenses mounted in the grooves for rotatable movement to various adjusted positions and each lens being of semi-circular formation to provide a straight edge and to leave an unoccupied space in the rims, means to hold the lenses in adjusted positions, lugs formed on the straight edges of the lenses adjacent to the outer ends thereof and extending forwardly therefrom at right angles thereto, and said lugs providing handles to facilitate the movement of the lenses.

2. Anti-glare goggles comprising a frame including circular rims, each having a groove in the inner surface thereof, concavo-convex translucent lenses mounted in the grooves for rotatable movement to various adjusted positions, each lens being of semi-circular formation to provide a straight edge and to leave an unoccupied space in the rims, lugs formed on the lenses and providing handles to facilitate the movement thereof, and substantially semi-circular strands of resilient wire rotatably mounted in the grooves and having inwardly bent ends engaged with the straight edges of the lenses for holding the latter in their adjusted positions.

3. Anti-glare goggles comprising a frame including circular rims, each having a groove in the inner surface thereof, semi-circular translucent lenses providing inner straight edges therefor and mounted in the grooves for rotatable movement to various adjusted positions, lugs formed on the lenses and extending at right angles from adjacent the ends of the straight edges thereof to provide handles to facilitate the adjustment of the lenses, and extensions formed on the straight edges at the ends thereof and received in the channels to aid in holding the lenses in the rims.

ANTOINETTE P. BELL.